UNITED STATES PATENT OFFICE.

ADAM LEBKÜCHER, OF BELLEVILLE, ILLINOIS.

IMPROVEMENT IN LUBRICATING COMPOUNDS.

Specification forming part of Letters Patent No. 3 ,631, dated June 25, 1861; Reissue No. 1,329, dated August 19, 1862.

*To all whom it may concern:*

Be it known that I, ADAM LEBKÜCHER, of Belleville, in the county of St. Clair and State of Illinois, have invented a new and Improved Lubricating Compound; and I declare the following to be a full, clear, and exact description thereof and of my method of making and compounding the same, viz:

I dissolve a quantity of zinc in muriatic acid of the ordinary temperature without the aid of heat, using sufficient zinc to saturate the acid. I then heat about one-quarter of a pound of this solution with about one hundred pounds of rosin-oil to about 160° or 165° Fahrenheit, whereby the impurities are separated. I obtain this oil usually by distillation from crude rosin as follows: I fill a large iron retort with rosin and add the solution, muriate of zinc, in the proportions aforesaid—namely, about one-quarter to one hundred pounds. Chloride of zinc may be used in the same proportion in place of the muriate, as described above; but I prefer the latter. I then distill the oil from the rosin, the muriate or chloride of zinc serving to precipitate the gummy parts and other impurities of the rosin. The rosin-oil thus distilled from the rosin is drawn off in a clear and thin liquid and put into an open kettle, where it is heated to about 140° Fahrenheit. With this rosin-oil thus refined and heated I then mix pure slaked lime reduced to a fine powder in about the proportion of fifteen pounds or twenty pounds of lime to forty gallons of the oil. I then raise the heat of this mixture to about 190° Fahrenheit, and boil it for about one-half or three-quarters of an hour. It is then allowed to cool after being drawn off. Water—rain or river water being preferable—is then added to the mixture thus cooled in the proportion of about one gallon of water to twenty gallons of the mixture, which is then well stirred until it turns into a whitish butter-like mass, which itself is a good lubricator, and can be used as such without further delay. This compound is my invention for which I claim Letters Patent. The lubricating qualities of the compound are greatly improved by adding to the said mixture, when cooled, together with the water, and well stirring in said mixture, any animal or vegetable oil in small quantities. I never use coal-oil. In manufacturing I find olive-oil to be the best for this purpose, and have used it in the proportion of about one-half gallon of the oil to twenty gallons of the mixture. Lard-oil or whale-oil in twice the quantity (one to twenty) is a good substitute for olive-oil. I generally use lard, however, in preference to either of these oils, on account of its cheapness. I mix one and a half gallon with twenty gallons of the compound, after adding the water as above, and stir the whole well together, when it is ready to be used for lubricating purposes in the form above mentioned.

By the action of the muriate (or chloride) of zinc the gummy substances contained in the rosin are removed from the rosin-oil, and the lime and water added afterward serve to give consistence to the compound, and thus prevent its freezing in winter or liquefying in summer. It is cheap, free from gum, and especially suitable for wagon-axles of iron or wood. It can be used with advantage, also, for all kinds of journals and other parts of machinery exposed to friction.

What I claim is—

The use for lubricating purposes of rosin-oil, muriate or chloride of zinc, lime, and water, combined together as above described.

ADAM LEBKÜCHER.

Witnesses:

N. NILES,
RICHARD WANGELIN,
JOS. B. CANMAN.